Dec. 18, 1928.  
B. R. BENJAMIN ET AL  
1,695,522  
POWER DRIVE GRAIN BINDER  
Filed Feb. 3, 1923  
4 Sheets-Sheet 1

Inventors.  
B. R. Benjamin  
C. R. Raney  
and W. Webber,  
By H. P. Doolittle  
Atty.

Dec. 18, 1928. 1,695,522

B. R. BENJAMIN ET AL

POWER DRIVE GRAIN BINDER

Filed Feb. 3, 1923 4 Sheets-Sheet 2

Inventors.
B.R.Benjamin
C.R.Raney
and W.Webber,

By
Atty.

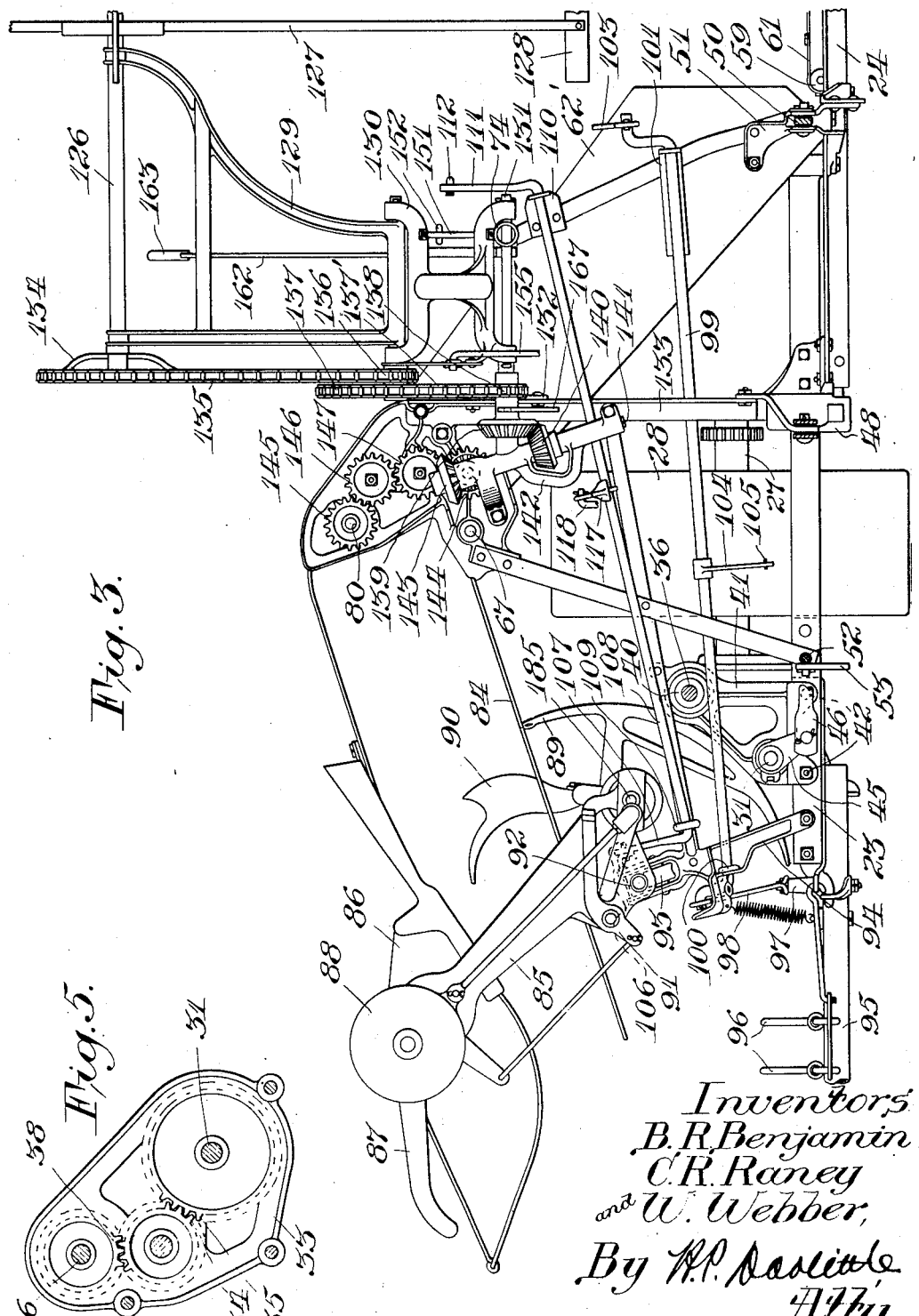

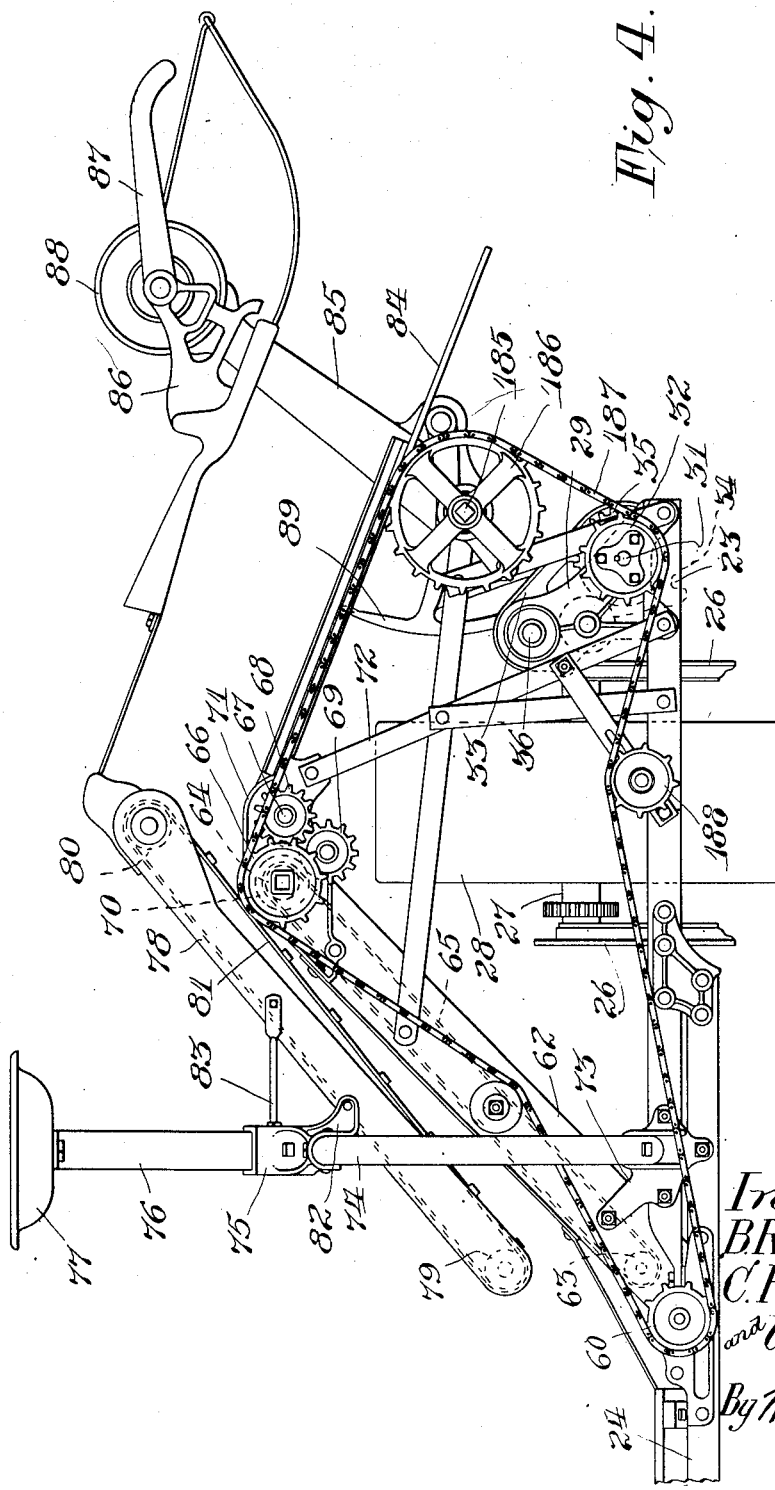

Patented Dec. 18, 1928.

1,695,522

UNITED STATES PATENT OFFICE.

BERT R. BENJAMIN, OF OAK PARK, CLEMMA R. RANEY, OF CHICAGO, AND WILLIAM WEBBER, OF LA GRANGE, ILLINOIS, ASSIGNORS TO INTERNATIONAL HARVESTER COMPANY, OF CHICAGO, ILLINOIS, A CORPORATION OF NEW JERSEY.

POWER-DRIVE GRAIN BINDER.

Application filed February 3, 1923. Serial No. 616,645.

This invention relates to implements such as harvesters, and more particularly to harvester or implement attachments for motor propelled vehicles or tractors.

The general use of tractors for propelling and operating farm implements is becoming more and more common, and one of the problems that confronts the farm implement manufacturer of today is how best to adapt their implements for tractor propulsion and operation; and also how best to construct such implements so that they will withstand excessive vibration and speed.

There are many important factors to be solved in connection with these problems, among them, the ease with which the implement and tractor may be connected and disconnected from each other, and the operation of the implement and the tractor from the operator's seat on the tractor. It is also, of course, advisable to eliminate as far as possible the unnecessary parts of the harvester by a construction and arrangement of the various parts in the manner hereinafter described.

The present invention has been developed with the above mentioned difficulties in view, and the invention has for its objects to adapt a harvester for tractor propulsion and operation; to eliminate as far as possible the unnecessary parts from the implement; to reduce the diametral size of the main wheel, thereby lowering the elevator frame of the implement; to provide means for adjusting the various movable elements of the implement from the operator's seat on the tractor or from the operator's seat on the implement; to provide a supporting and coupling construction formed as a detachable part of the implement so designed that the implement and the tractor may be connected together and disconnected from each other with a minimum expenditure of time and labor; and to provide a power transmission mechanism through which the operative elements such as the knife, reel, aprons and binding mechanism are continuously driven regardless of the position the implement assumes with respect to the tractor in turning.

In the present instance, means have been provided on the coupling or hitch connection between the implement and tractor for lifting and supporting the front end of the implement in order to properly position the tongue for connecting the same to the tractor. The hitch connection illustrated comprises a tongue which has its rear end pivoted to the front end of the implement and its forward end connected to the tractor and the tilting and adjusting mechanism for the implement in the form of the invention comprises lever mechanism carried by the hitch connection in which one of the levers may be employed for adjusting a prop for supporting the tongue. Various other features have been incorporated in the improved construction, such as positioning the pivotal connection of the tongue and tractor substantially centrally between the two universal joints of the power transmission shaft, improved means for positioning the implement in offset relation with respect to the tractor in such a manner that the power shaft maintains a position parallel to the longitudinal travel of the tractor. These and other detail features will be more fully described in the specification and therefore need not be mentioned further in this brief statement of the invention.

With the above objects in view and with further objects which will appear as the description proceeds, we have illustrated in the drawings one practical embodiment of the invention.

In the drawings—

Fig. 3 is a front elevational view of our improved implement;

Fig. 4 is a rear elevational view of the implement; and

Fig. 5 is an enlarged detail view showing the construction of the reduction gear mechanism.

Figure 1:
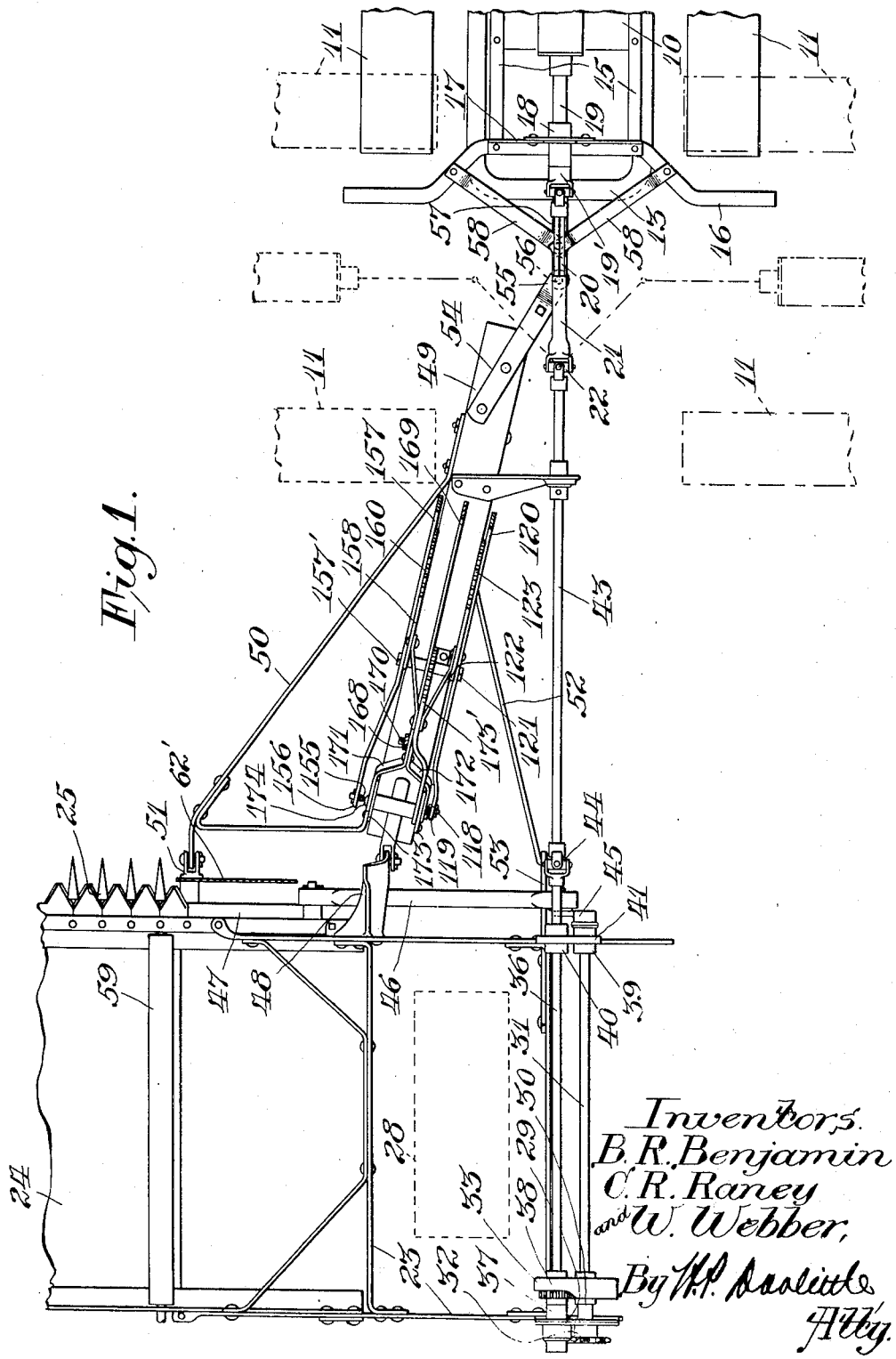
Fig. 1 is a fragmental top plan view of our improved power drive harvester showing the manner in which it is connected to the rear end of a tractor.

In the embodiment of the invention illustrated in the drawings, we have shown a grain binder combined with a tractor and a connecting mechanism or draft connection between the two machines and the operative drive connections for the harvester. It should be understood, however, that this particular form of an implement has been shown merely for the purpose of illustrating a practical embodiment of the invention, and that the invention is equally well adapted for connecting and driving other similar implements with a tractor.

The tractor illustrated in connection with our invention is of conventional design, the rear portions of which only being shown in the drawings. It embodies a frame 10 carried by the usual main traction wheels 11 and provided with the usual operator's seat 12. Extending rearwardly from the main frame 10 of the tractor is a U-shaped draft member 13 which is braced to the frame of the tractor by means of a brace bar 14. Secured to the main frame 10 and extending rearwardly therefrom are the usual platform supporting bars 15. Secured to the rearwardly extending platform bars 15 is a transverse bar 16 and secured to the transverse bar 16 is a bearing bracket 17 in which is mounted a bearing bushing 18. The bearing bushing 18 rotatably supports the power transmission shaft 19 which is operatively connected to the transmission mechanism of the tractor, not shown. Positioned adjacent the bearing bushing 18 is the universal joint 19'. The rear end portion of the joint 19' has a square cross section portion 20 and is adapted to slidably connect with a sleeve member 21 which is formed as part of a second universal joint 22 on the power transmission shaft which drives the operative elements of the harvester.

The harvester shown in the drawing comprises the usual main frame 23 having the grasswardly extending platform 24 and cutting mechanism 25. Secured on the opposite sides of the main frame 23 are the usual main wheel adjusting brackets 26 which adjustably support the main axle 27 of the main wheel 28. In this connection, it will be noted that the main wheel is considerably smaller in diameter than the main wheel that is usually employed in the regular harvesters now on the market. By reason of this reduced diametral size, it will also be noted that the elevator frame is considerably lowered thereby giving a more gradual incline or slope to the elevators as well as to the binder deck. Secured to the rear side of the main frame 23 is a bearing bracket 29. Supported in the bracket 29 is a bushing 30. Rotatably mounted in the bushing 30 is the rearward end of the crank shaft 31. Secured to the rearward end of the crank shaft 31 is a sprocket 32 for the purpose hereinafter set forth. Also secured to the rear portion of the main frame 23 is a reduction gear bracket 33. Supported by the brackets 29 and 33 is an intermediate gear 34 which meshes with a gear 35 secured to the crank shaft 31. Extending parallel to and above the crank shaft 31 is a supplemental shaft 36 which is also supported by the brackets 29 and 33 by means of a bushing 37. Secured to the rear end of the supplemental shaft 36 and meshing with the intermediate gear 34 is a drive gear 38. The forward ends of the crank shaft 31 and supplemental shaft 36 are mounted in the bushings 39 and 40 respectively which are held in position by a bracket 41 secured to the forward side of the main frame 23 by means of bolts 42. The forward end of the supplemental shaft 36 is connected to a tumbling shaft or power shaft 43 by means of a universal joint 44 and the forward end of the tumbling shaft 43 is connected to the universal joint 22 previously described. The forward end of the crank shaft 31 is provided with a crank 45, the free end of which is connected by means of a pitman 46 to the reciprocating knife 47. As shown in Fig. 1, the power transmission shaft, which includes the supplemental shaft 36, tumbling shaft 43 and the sleeve 21, together with the power shaft 19 from the transmission mechanism, extends directly rearwardly and parallel to the longitudinal travel of the tractor. This position is the position normally assumed by this shaft in its straight-forward travel across the field.

Secured to the forward side of the main frame 23 is a draft bracket 48. Pivoted to the draft bracket 48 for vertical adjustment is a tongue 49. In order to brace the tongue 49 against lateral movement a converging brace 50 is secured to said tongue and pivoted to a member 51 spaced grasswardly from the draft bracket 48 and fixed to the main frame of the harvester. An additional stubbleward brace 52 is fixed to the tongue 49 and pivoted to a bracket 53 spaced stubblewardly from draft bracket 48 and fixed to the main frame 23 of the harvester. By this arrangement, it will be seen that a very rigid draft member is provided in which this member has three spaced pivotal connections with the implement. The forward end of the tongue 49 is provided with two angularly disposed straps 54 which are arranged on the upper and lower sides of said tongue and converge at 55. The converged portions 55 are provided with two registering apertures which are adapted to receive a bolt 56 for pivotally securing the implement to the draft member 57 of the tractor. The draft member 57 has its forward end bent downwardly and secured to the U-shaped member 13 of the tractor. The upper end of the draft member 57 is braced to the transverse bar 16 by means of diverging braces 58. From this construction, it will be seen, by referring to Fig. 1, that the pivotal connection of the implement with the tractor is in a vertical plane directly below the power transmission shaft when this shaft assumes a longitudinal position parallel to the travel of the tractor and implement. It will also be noted that this pivotal point or connection 56 is positioned substantially centrally between the universal points 19' and 22 of the power shaft. By this arrangement, it will be seen that a greater range of turning of the tractor with respect to the implement may be had during the continuous operation or transmission of the power from the tractor to the implement. In other words, by this arrangement, the tractor is permitted to turn with respect to the harvester from one extreme position to the other extreme position through an angle of 180 degrees and yet at the same time to operatively drive the movable elements of the harvester through the power shaft. (As shown in the dotted lines in Fig. 1.)

The harvester here shown is provided with the usual platform roller 59 driven by means of a sprocket 60 secured to the rearward end of the platform roller. The usual conveyer apron 61 is operatively connected or mounted on the platform roller 59. As the construction above described is the construction now in general use, a complete showing is thought to be unnecessary. Secured to the main frame 23 of the harvester is the usual lower elevator frame 62. Mounted in the upper and lower ends of the lower elevator frame are the usual conveyer apron rollers 63 and 64. Operatively connected to the rollers 63 and 64 is the usual endless conveyer 65. The lower elevator conveyer 65 is operatively driven by a sprocket 66 secured to the upper roller 64. Positioned parallel with and stubblewardly from the roller 64 is an idler roller 67 which is operatively driven by a pinion 68 fixed to the rear end of said last mentioned roller. The pinion 68 is driven by an intermediate idler gear 69 which meshes with a gear 70 which is formed as an integral part of the sprocket 66. The bearings and studs which form the supports for the various rollers and gears just described are held in their operative positions by a bracket 71 secured to the elevator frame 62 and braced to the main frame by a bar 72. Secured to the rearward side of the main frame 23 is a seat pipe bracket 73. Secured to the seat pipe bracket 73 is a seat pipe 74 which extends upwardly and forwardly from the rear of the main frame to the forward side of the main frame 23. Positioned on the upper side of the seat pipe 74 is the usual seat spring bracket 75, seat spring 76 and seat 77. Positioned above the elevator frame 62 is an upper elevator frame 78 which is provided with lower and upper rollers 79 and 80. Operatively mounted on the rollers 79 and 80 is the usual upper elevator apron 81. The upper elevator frame 78 is held in position by being secured to the seat spring bracket 75 at 82 and by an adjustable connection 83. Extending downwardly from the idler roller 67 is the usual deck 84 which is supported on the usual binding attachment 85. The binding attachment 85, which includes the knotting mechanism 86, discharge arms 87, cam 88, needle 89, packers 90 and tripping mechanism 91, is of the usual construction and any further detailed description of the same is unnecessary. It will, of course, be understood that the binding attachment just described is adjustably mounted by a pipe 92 on a roller 93 rotatably supported in the post 94 secured to the main frame 23.

The bundle carrier in the present instance, only part of which is shown in Fig. 3, is of the construction now in general use, and comprises the usual supporting pipe 95, tines 96, crank 97, connection 98 and crank shaft 99. The stubbleward end of the crank shaft 99 is pivoted in the post 94 at 100 and the grassward end of the crank shaft 99 is pivotally supported in a bracket 101 secured to the front elevator frame member 62'. The stubbleward end of the crank shaft 99 is connected to a foot treadle 102 by means of a connecting rod 103. Secured intermediate the ends of the crank shaft 99 is a crank 104 which is provided with a rope 105 which in practice will be extended forwardly to the operator's seat 12 on the tractor from which position the operator on the tractor may dump the bundle carrier or, if it is so desired, an operator on the seat 77 of the implement may manipulate the foot treadle 102 to dump the carrier.

The usual mechanism for shifting the position of the bands on the bundle comprises the link 106 connected to the crank 107 formed on the stubbleward end of the shaft 108. The shaft 108 is pivotally supported in a bearing member 109 secured to the post 94. The grassward end of the shaft 108 is supported in a bracket 110 secured to the front elevator frame 62'. The stubbleward end of the shaft 108 has formed integral therewith a crank 111. The crank 111 is connected by means of a rod 112 to a hand operating lever 113 which is adapted to be operated or adjusted in various positions by the operator from the seat 77 of the implement. The lever 113 is pivoted at 114 to the seat pipe 74 and is adapted to be locked in various positions of adjustment by detent mechanism 115. The detent mechanism 115 is adapted to engage a segmental toothed bracket 116 secured to the seat pipe 74. Secured intermediate the ends of the shaft 108 is a crank 117. The free end of the crank 117 is connected by means of a link 118 to the free end 119 of the lever 120. The lever 120 is pivoted at 121 to a bracket 122 which is fixed to the tongue 49. The bracket 122 is provided on its forward side with a toothed segment 123 which is adapted to engage a detent mechanism 124 for locking the lever 120 in various positions of adjustment. The lever 120 extends forwardly to be within easy reach of the operator on the seat 12 of the tractor. In connection with the adjusting of the binding attachment, it will be noted that the detent mechanism 115 on the harvester may be held inoperative by positioning a ring 125 over this detent mechanism and thereby disengaging the detent mechanism from the toothed segment 116.

The harvester illustrated is provided with the usual reel which comprises a reel shaft 126, reel arms 127, and reel bats 128. The reel shaft is rotatably mounted in the usual reel frame 129 pivoted to the supplemental frame 130, the supplemental frame 130 being pivotally mounted on a shaft 131 secured in the forward end of the seat pipe 74 and rotatably mounted in a bracket 142 secured to the frame angle 133 which is secured to the main frame 23 of the harvester, and to the front elevator frame 62'. The reel is operatively driven through a gearing mechanism which includes a sprocket 134, fixed to the shaft 126, a chain 135, a second sprocket 136 formed integrally with a third sprocket 137, a chain 137', and a sprocket 138 formed integrally with a beveled pinion 139 driven by a pinion 140. The pinion 140 is fixed to a shaft 141 mounted in the bracket 142, and secured to the upper end of the shaft 141 is a beveled gear 143 meshing with a beveled gear 144. The beveled gear 144 is secured to the roller 70; and through the sprocket 66, the power is transmitted through the roller 70 from the rear of the harvester to the front of the harvester, thereby operatively driving the reel 127 through the above described gearing mechanism. The upper elevator roller 80 has secured at its forward end a gear 145 which meshes with intermediate gear 146. The gear 146 meshes with gear 147 which in turn meshes with a gear formed integrally with the beveled gear 144. Through this gearing mechanism just described, the upper elevator conveyer is operatively driven.

The usual mechanism for adjusting the reel rearwardly and forwardly as well as vertically includes the usual lever 148 pivoted at 114 to the seat pipe 74. The lever 148 is adapted to be positioned and locked in various positions of adjustment by means of a detent mechanism 149 which engages a second segmental toothed rack, (not shown) corresponding to the rack 116 and secured to the pipe 74. The lever 148 is connected by means of a rod 150 to the reel frame 129 for adjusting the reel forwardly and rearwardly. The mechanism for adjusting the reel in a vertical plane comprises a bracket member 151 secured to the supplemental frame 130. Pivotally connected to the bracket 151 is a connecting rod 152, the rear end of the connecting rod 152 being connected to a lever 153 which is adapted to be locked in various positions of adjustment by a detent mechanism 154 engageable with a segmental toothed rack similar to the rack 116. Pivotally connected to the supplemental reel frame 130 is a connecting link 155 which has its lower end connected to the free end 156 of the lever 157. The lever 157 is pivoted at 157' to a bracket 158 secured to the grassward side of the tongue 49. The lever 157 is provided with a detent mechanism 159 which is adapted to engage a segmental toothed rack 160 formed integrally with the bracket 158. Through this mechanism just described, it will be understood that the lever 157 may be manipulated from the operator's seat 12 on the tractor for adjusting the height of the reel and when the same is manipulated from the tractor seat, the detent mechanism 154 of the lever 153 adjacent the operator's seat on the implement is held in inoperative position by a link 161.

The mechanism for tilting the harvester or the platform about the pivot of the tongue comprises the usual operating lever 162 provided with the usual detent mechanism 163 which is adapted to engage and lock the lever 162 in various positions of adjustment by a segmental toothed rack 164 secured to the seat pipe 74. The lever 162 is secured to the shaft 165 which has its grassward end pivotally mounted in a bearing formed in the seat pipe 74. The grassward end of the shaft 165 is supported in the bearing member 132 secured to the vertical frame member 133. The shaft 165 has formed on its stubbleward end a curved crank 167. The free end of this crank is connected by means of a link 168 to a lever 169 at 170. The lever 169 has its lower end bent outwardly or stubblewardly at 171 and a member 172 corresponding to the bent portion 171 is secured to the lever 169. By this construction, a forked member is formed which embraces the outer sides of two plate members 173 to which the lever is pivoted at 174, the plate members 173 being secured to the opposite sides of the tongue 49. Formed integrally with the lever 169 on the grassward side of the tongue 49 is a crank arm 175. The free end of this crank arm 175 is connected to an extension spring 176. The forward end of the extension spring is connected to an extension 177 formed as a continuation of the toothed bar 160. The extension spring 176 forms a counterbalancing spring for the weight exerted on the pivot between the tongue and the implement. By this construction, it will be noted that the spring normally exerts an upward force on the lever 169 and thereby forces the link 168 upwardly relieving the pressure or weight on the forward side of the implement. By the construction here shown, it will be noted that the implement may be tilted from the operator's seat on the tractor by means of the lever 169 or may be tilted from the operator's seat 77 on the implement.

The mechanism for supporting or propping up the tongue of the implement for connecting or disconnecting the implement from the tractor comprises a prop 178 pivoted at 179 to the tongue 49. The free end of the prop is provided with an inclined plate 180.

Figure 2:
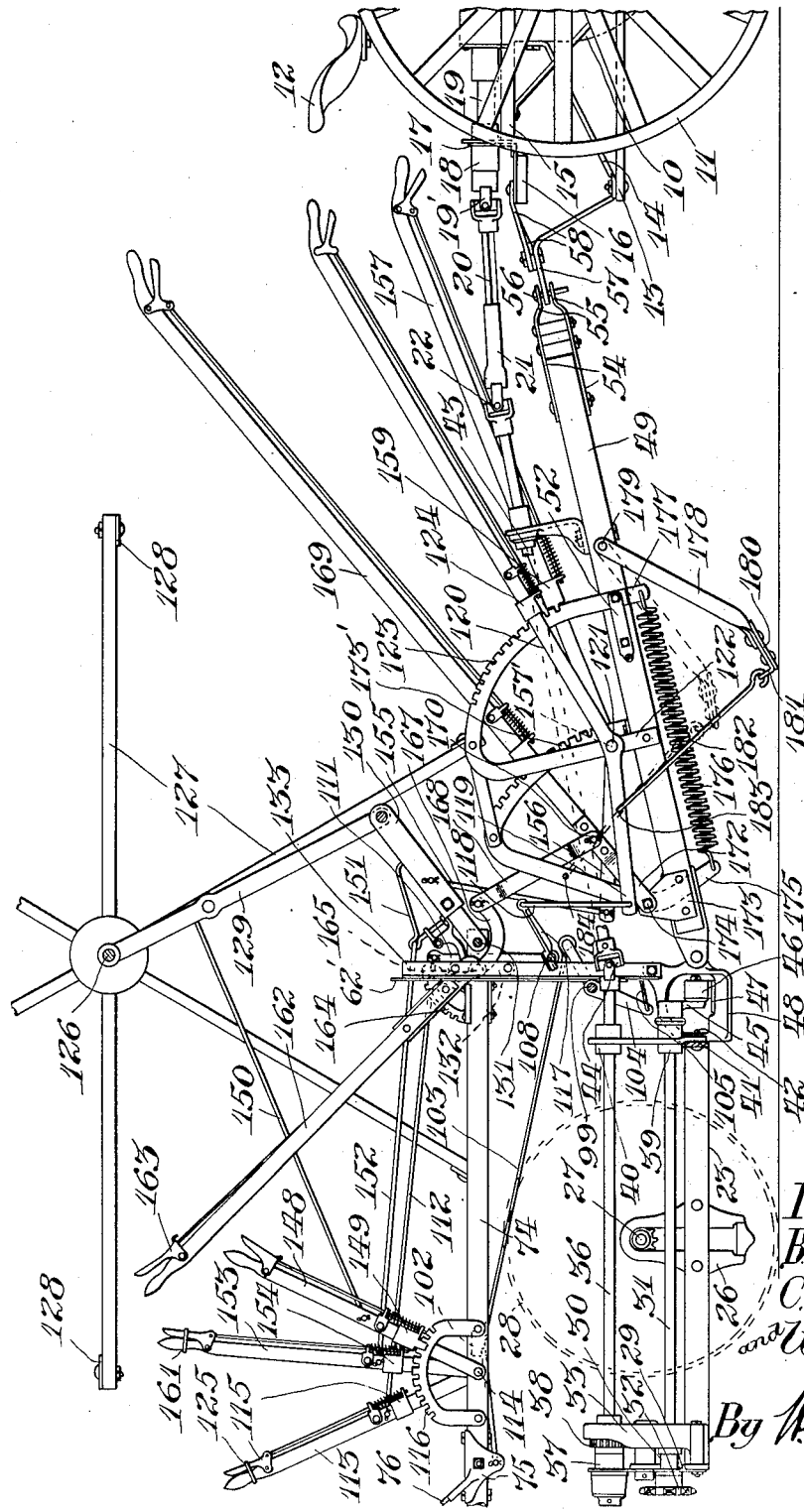
Fig. 2 is a side elevational view of Fig. 1.

The rear end of the prop 178 is provided with a right angularly bent portion 181 which is adapted to pivotally receive a link 182. The upper end of the link 182 is adapted to be pivotally connected at 183 to the lever 120. When the same is connected up in this position or the position shown in full lines in Fig. 2 and the lever 120 is swung upwardly, the whole forward weight of the implement is sustained by the prop 178 and the pin 56, connecting the implement with the tractor, may be inserted or withdrawn for connecting or disconnecting the implement and tractor. When the prop 178 is not being used, it is swung up into the position shown in dotted lines in Fig. 2 in which the link 182 is connected in the aperture 184 in the bracket 173′.

The packer shaft 185 of the binding attachment 85 together with the binding mechanism itself is operatively driven through a sprocket 186 secured to the rear end of said shaft. The sprocket 186 together with the sprocket 66 and sprocket 60 is driven by the chain 187, the chain 187 being operatively driven by the sprocket 32 secured to the crank shaft 31. It will be noted that the usual chain tightener sprocket 188 is provided for taking up the slack in the drive chain 187.

In the operation of the above described mechanism, let us assume that the implement is to be connected to the tractor. The lever 120 is elevated or lifted and the prop 178 depressed thereby until the tongue 49 has been raised to a position so that the draft member 57 of the tractor may be inserted between the converging straps 54 and the pin 56 inserted in the registering apertures. Then the power shaft is connected up in the manner shown in Figs. 1 and 2 in which the power transmission shaft extends parallel to the longitudinal direction of travel of the harvester to a supplemental shaft mounted in the harvester. From there the power is transmitted through the reduction gearing mechanism which includes gear 38, intermediate gear 34 and crank shaft gear 35. The various elevator rollers and packer shaft are driven by the chain 187 which is driven by the sprocket 32 fixed to the crank shaft 31.

The adjustments of the reel may be made by means of the levers 148 and 153 which are of a construction now generally employed in the regular grain harvester. Similarly the binding attachment may be shifted forwardly or rearwardly for changing the position of the bands on the bundles through the lever 113, connection 112 and crank shaft 108 and connection 106 to the binding attachment. If it is desirous to adjust these elements from the tractor, the rings 125 and 161 are placed on the levers 113 and 153 respectively. This prevents these levers from locking in their respective toothed sectors. Then these elements may be adjusted from the seat 12 of the tractor by manipulating the levers 120 and 157 respectively. As previously described, the raising and lowering of the reel may be accomplished from the seat of the tractor by manipulating the lever 157 through the connection 155 to the supplemental reel frame 130. It will, of course, be understood, if it is desired to operate the reel by an operator on the implement, the connecting link 155 is disengaged from the supplemental reel frame 130. In connection with the tilting of the harvester in respect to the tongue, it will be understood that this may be accomplished by manipulating the lever 162 from the seat of the implement or manipulated from the seat of the tractor by manipulating the lever 169. In either case, it is not necessary to disengage or hold in inoperative position either lever.

From the above description, it will be seen that the construction of a tractor operating harvester has been materially decreased in weight and that the harvester comprises fewer parts and is much simpler in construction, and it will also be seen that we have provided a simple and practical means for easily and quickly connecting the harvester to the tractor and for disconnecting the machines from each other. From the description above outlined, it will also be evident that a wide range of angular adjustment of a tractor with respect to the implement may be had without affecting or interrupting the continuous operation of the movable parts of the harvester.

While in the above specification we have described one embodiment which our invention may assume in practice, it should of course be understood that the invention is not limited to the particular construction illustrated but that changes and modifications may be made in the various cooperating parts without departing from the spirit and scope of the invention as expressed by the following claims.

What we claim is:

1. An implement having a plurality of movable elements, a tongue connected to said implement, a lever pivotally mounted on said tongue for adjusting one of said movable elements and having an angular extension beyond its pivot, and means including a prop pivoted to said tongue and a link pivotally connecting said prop with the extension on said lever for adjustably supporting the forward end of said implement.

2. In combination, a tractor, an implement having a plurality of movable elements, a tongue pivotally connected to said implement and connected to said tractor, a plurality of levers pivotally mounted on said tongue for adjusting the movable elements of said implement, said levers extending forwardly in a manner to be operated from the seat of the tractor, and one of them having an extension beyond its pivot on the tongue, and a prop pivoted to the tongue and connected to the lever extension for adjustably supporting the front end of the implement so that the same may be positioned to be connected or disconnected to the tractor.

3. The combination with a tractor having a power take-off shaft and a draw bar, of a harvester having a tiltable frame and a driven shaft, a draft connection between the draw bar and harvester, said draft connection having a pivotal connection to the draw bar and another pivotal connection to the harvester frame, an extensible shaft connected to the tractor power take-off shaft by a universal joint located forwardly of the pivotal connection of the draft connection to the draw bar, a connecting shaft between said harvester driven shaft and said extensible shaft, a universal joint between the connecting shaft and extensible shaft located rearwardly of the pivotal connection of the draft connection to the draw bar, and another universal joint joining the connecting shaft with the harvester driven shaft, said last mentioned universal joint located in substantially the same vertical plane with the tilting pivot of the harvester frame to the draft connection.

4. The combination with a tractor having a power take-off shaft and a draw bar, of a harvester having a tiltable frame and a driven shaft, a draft connection pivoted to the draw bar to permit horizontal turning and pivoted to the harvester frame to permit vertical tilting of the frame, a shaft carried on the draft connection and including a universal joint connection to the harvester driven shaft, said universal joint located in substantially the same vertical plane with the tilting pivot of the harvester frame, a telescopic shaft crossing the pivot of the draft connection to the draw bar, and a plurality of universal joints for connecting said telescopic shaft to the power take off shaft and to the shaft carried on the draft connection, said universal joints being located on opposite sides of the turning pivot of the draft connection to the tractor draw bar.

5. The combination with a tractor having a power take-off shaft and a draw bar, of a harvester having a tiltable frame and a driven shaft, a diagonally disposed draft connection pivoted to the draw bar to permit horizontal turning and pivoted to the harvester frame to permit vertical tilting thereof, shafting carried on the draft connection, a universal joint in substantially the same vertical plane with the tilting axis of the harvester frame and connecting said shafting with the harvester driven shaft, and a pair of universal joints in said shafting adjacent the turning pivot of the harvester, one of said universal joints connecting the shafting to the tractor power take-off shaft.

Signed at Chicago, in the county of Cook and State of Illinois, this 20th day of January, 1923.

BERT R. BENJAMIN.
CLEMMA R. RANEY.
WILLIAM WEBBER.